US010153927B2

(12) United States Patent
Undheim et al.

(10) Patent No.: US 10,153,927 B2
(45) Date of Patent: Dec. 11, 2018

(54) AM DEMODULATION WITH PHASE AND SYMBOL EDGE DETECTION

(71) Applicant: Nordic Semiconductor ASA, Trondheim (NO)

(72) Inventors: Ruben Undheim, Trondheim (NO); Ola Bruset, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 15/528,433

(22) PCT Filed: Nov. 20, 2015

(86) PCT No.: PCT/GB2015/053543
§ 371 (c)(1),
(2) Date: May 19, 2017

(87) PCT Pub. No.: WO2016/079534
PCT Pub. Date: May 26, 2016

(65) Prior Publication Data
US 2018/0183637 A1 Jun. 28, 2018

(30) Foreign Application Priority Data

Nov. 21, 2014 (GB) .................................. 1420711.2

(51) Int. Cl.
*H04L 27/06* (2006.01)
(52) U.S. Cl.
CPC .................................. *H04L 27/06* (2013.01)
(58) Field of Classification Search
CPC . H04L 25/067; H04L 1/0045; H04L 27/2647; H03L 7/0807
USPC ........ 375/340, 226, 157, 327, 376; 327/156, 327/157
See application file for complete search history.

(56) References Cited

U.S. PATENT DOCUMENTS

| 4,947,407 A | 8/1990 | Silvian |
| 6,255,901 B1 | 7/2001 | Steinhagen et al. |
| 2013/0141145 A1* | 6/2013 | Yu .......................... H03L 7/0807 327/157 |
| 2013/0156117 A1 | 6/2013 | Liu et al. |
| 2015/0156009 A1* | 6/2015 | Bogdan ............... H04L 27/2601 375/376 |
| 2015/0270948 A1* | 9/2015 | Khan .................... H04L 7/0331 375/327 |

FOREIGN PATENT DOCUMENTS

WO  WO 2008/093254  8/2008

OTHER PUBLICATIONS

International Search Report and Written Opinion, International Application No. PCT/GB2015/053543, dated Feb. 16, 2016, 13 pages.
Farjad-Rad et al., "A 0.3-μm CMOS 8-Gb/s 4-PAM Serial Link Transceiver," *1999 Symposium on VLSI Circuits Digest of Technical Papers*, pp. 41-44, Jun. 17, 1999.

\* cited by examiner

*Primary Examiner* — Khai Tran
(74) *Attorney, Agent, or Firm* — Klarquist Sparkman, LLP

(57) ABSTRACT

A method of demodulating an amplitude modulated radio signal is disclosed. The method comprises directing the modulated signal 302 to both a phase detector 308 and an edge detector 314, and using the respective output signals 310, 318, 320 of the phase detector 308 and edge detector 314 to determine an end of a modulation symbol 340 in the signal 302.

17 Claims, 4 Drawing Sheets

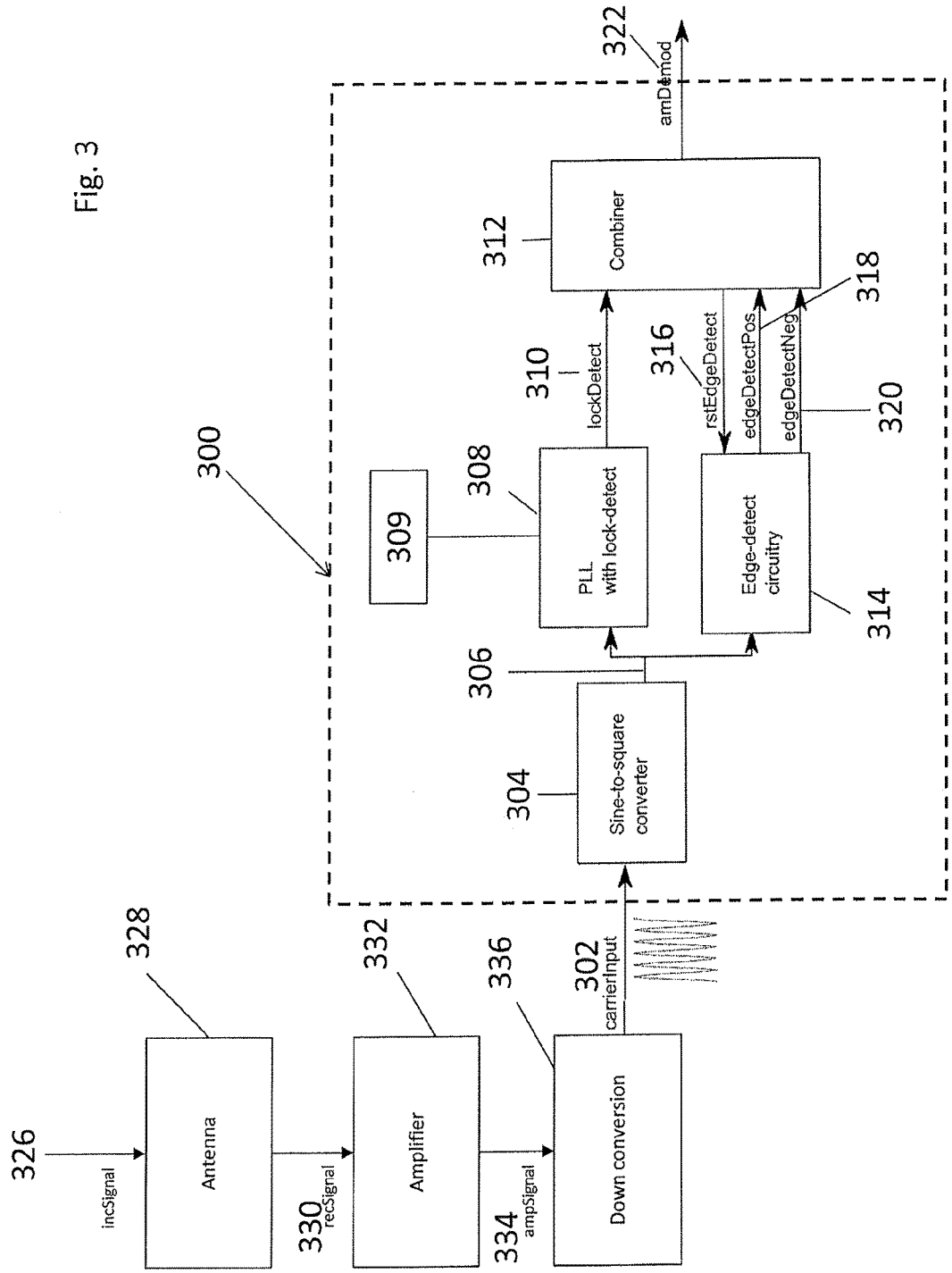

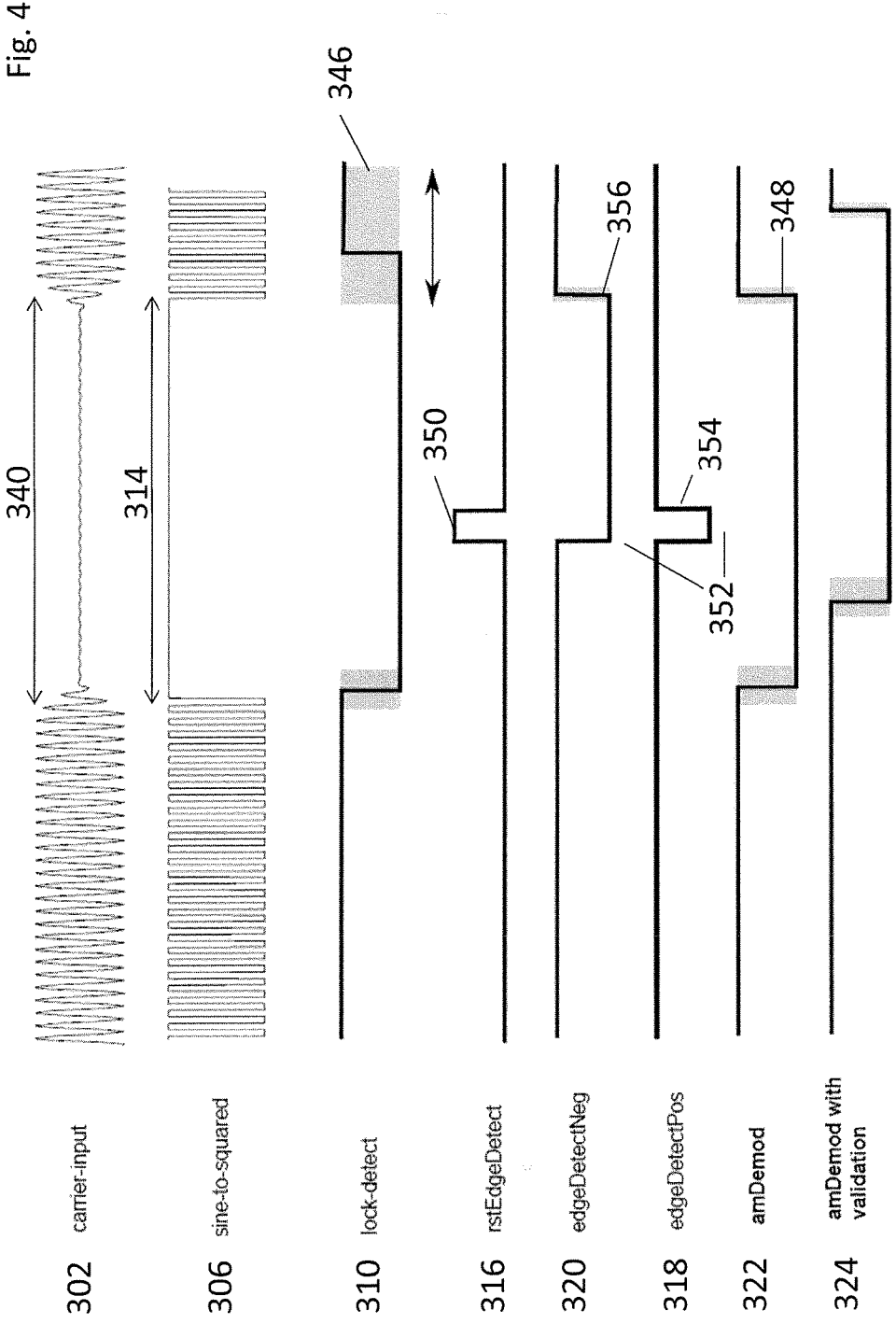

AM DEMODULATION WITH PHASE AND SYMBOL EDGE DETECTION

CROSS REFERENCE TO RELATED APPLICATIONS

This is the U.S. National Stage of International Application No. PCT/GB2015/053543, filed Nov. 20, 2015, which was published in English under PCT Article 21(2), which in turn claims the benefit of Great Britain Application No. GB1420711.2, filed Nov. 21, 2014.

BACKGROUND AND SUMMARY

This invention relates to demodulating amplitude modulated (AM) signals, particularly radio signals e.g. as used in short range data communication.

When demodulating signals it is sometimes necessary to determine accurately the edges of modulation symbols. For example, a wireless communication system may be configured such that a transmitter transmits AM signals comprising a periodic carrier signal modulated by modulation symbols to a receiver that must demodulate the AM signals in order to recover the information or data contained within the signal. If, for example, the signal conveys digital data comprising a repeating pattern carrier wherein the amplitude varies between two pre-determined levels, the accurate timing of the end of each modulation symbol can be critical to the operation of the system, particularly regarding starting timers that are used to set a starting point for a response at an exact point in time.

When demodulating AM modulation symbols from a modulated signal, it is known to use an envelope detector to extract a signal envelope that conveys the general shape of a modulating signal which, in general, will follow the modulating symbols that generated the modulated signal. Such an envelope detector often comprises a simple rectifier where the output signal of the rectifier is filtered using an analogue filter and then fed to a comparator to provide a demodulated signal.

The analogue filter used in such a solution typically suffers from process variation (differences between devices due to manufacturing processes) which may lead to inaccurate detection of the actual envelope and uncertainties in the timing of modulation symbol edges.

It is also known to use a phase locked loop (PLL) for demodulation in the case where only AM techniques have been used in the modulation of the signal. In such a system, both the modulated signal and a local oscillator signal are fed to a phase detector. When the input signal is modulated by suppressing the carrier, the phase detector will not sense any signal on the reference input and the PLL will lose phase lock. By using a simple lock detector circuit, known per se to a person skilled in the art, demodulation can be achieved.

A disadvantage of using a PLL is that the time that is required to detect phase lock depends upon the oscillator free-running frequency, which itself is typically dependent upon analogue process variation of the analogue components.

The present invention sets out to provide an alternative approach.

From a first aspect, the invention provides a method of demodulating an amplitude modulated radio signal comprising directing said modulated signal to both a phase detector and an edge detector, and using the respective output signals of the phase detector and edge detector to determine an end of a modulation symbol in said signal.

From a second aspect, the invention provides a receiver arranged to demodulate an amplitude modulated radio signal comprising a phase detector and an edge detector that are both arranged to receive the modulated signal, the receiver being arranged to use the respective output signals of the phase detector and edge detector to determine an end of a modulation symbol in said modulated signal.

Thus it will be seen by those skilled in the art that, in accordance with the invention, a receiver directs a modulated radio signal to both a phase detector in order to obtain the envelope of the modulated signal, and an edge detector which can determine an edge in the modulated signal. The outputs from both detectors can be used to determine the end of a modulation symbol and thus provide a demodulated signal output.

Using both a phase detector and an edge detector provides the ability to obtain a demodulated signal that has a reduced uncertainty with regard to the end of modulation symbols when compared to conventional systems without the edge detector.

There are a number of phase detector circuits known per se in the art. In some sets of embodiments, the phase detector comprises a phase locked loop and a lock detector.

In order to determine whether a modulation symbol is present, it is advantageous to convert the input signal, which is conventionally sinusoidal, to a square wave before providing it as an input to the phase detector. In some sets of embodiments, the modulated signal is fed to a sine-to-square converter.

The square wave output referred to above can be used to determine when modulation symbols are present on the modulated signal. In some further sets of embodiments, the output of the sine-to-square converter comprises a square wave when no modulation symbol is present and a constant value when a modulation symbol is present.

It is typically not always known in advance whether the square wave output will comprise a logic high or a logic low value when a modulation signal is present due to the nature of sine-to-square converter circuits. It is common for sine-to-square converters (such as those that utilise Schmitt triggers) to have hysteresis, such that it is not known what value the output will take when the input is below a threshold voltage required to overcome said hysteresis.

The end of modulation symbols present on the modulated signal may be determined by monitoring for a change in the value of the edge detector input from a first constant value to a second value. In some sets of embodiments, the edge detector comprises a first output that latches to a first level when the input to the edge detector is above a first threshold value, and a second output that latches to a second level when the input to the edge detector is below a second threshold value. The first and second thresholds may be the same but typically they are different.

The edge detector could produce an output continuously. In a set of embodiments however it instead monitors for the end of a modulation symbol only once it is known that such a modulation symbol is currently present on the modulated signal. In some sets of embodiments therefore, a combiner is provided which is arranged to reset the edge detector after the phase detector has detected a modulation symbol.

When it is determined that a modulation symbol is present on the modulated signal and the edge detector has been reset, it is then advantageous to monitor for the end of the modulation symbol. Due to the above-mentioned hysteresis effect present on the sine-to-square converter, it is typically not known in advance whether the end of the modulation symbol will be signified by a low-to-high transition or a high-to-low transition, but it is possible to determine the current level of the signal and monitor for a change to the corresponding opposite level. In some sets of embodiments, a combiner is arranged to detect a first output of the edge detector latching to a first output value after resetting the edge detector and monitors for a second output of the edge detector latching to a second output value.

After some time, the modulation symbol will end and the output from the sine-to-square converter will no longer remain constant. In a further set of embodiments, the second output of the edge detector latching to a second output value may be used to indicate the end of the modulation symbol.

In general there is a possibility that errors can occur in any given demodulation scheme and it is advantageous in some circumstances to reduce these errors by validating a detected end of a modulation symbol to ensure that it is genuine. In some sets of embodiments, an edge detected by the edge detector is validated by checking that the edge is followed by the phase detector output going high.

In some sets of embodiments, the demodulator is implemented in a battery powered integrated circuit.

A person skilled in the art would understand that the present invention has applications in a wide range of communication technologies. In some sets of embodiments, the demodulation is provided for use in near field communication (NFC) systems.

A person skilled in the art would also understand that the carrier referred to with regard to the present invention is not limited to a sinusoidal waveform and could comprise other forms including, but not limited to, square waves, saw-tooth waves triangular waves or other periodic waveforms.

BRIEF DESCRIPTION OF DRAWINGS

An embodiment of the present invention will now be described, by way of example only, with reference to the accompanying drawings, in which:

FIG. 3 is a block diagram of an exemplary embodiment of the present invention; and FIG. 4 is a timing diagram of an exemplary embodiment of the present invention.

DETAILED DESCRIPTION

Figure 1:
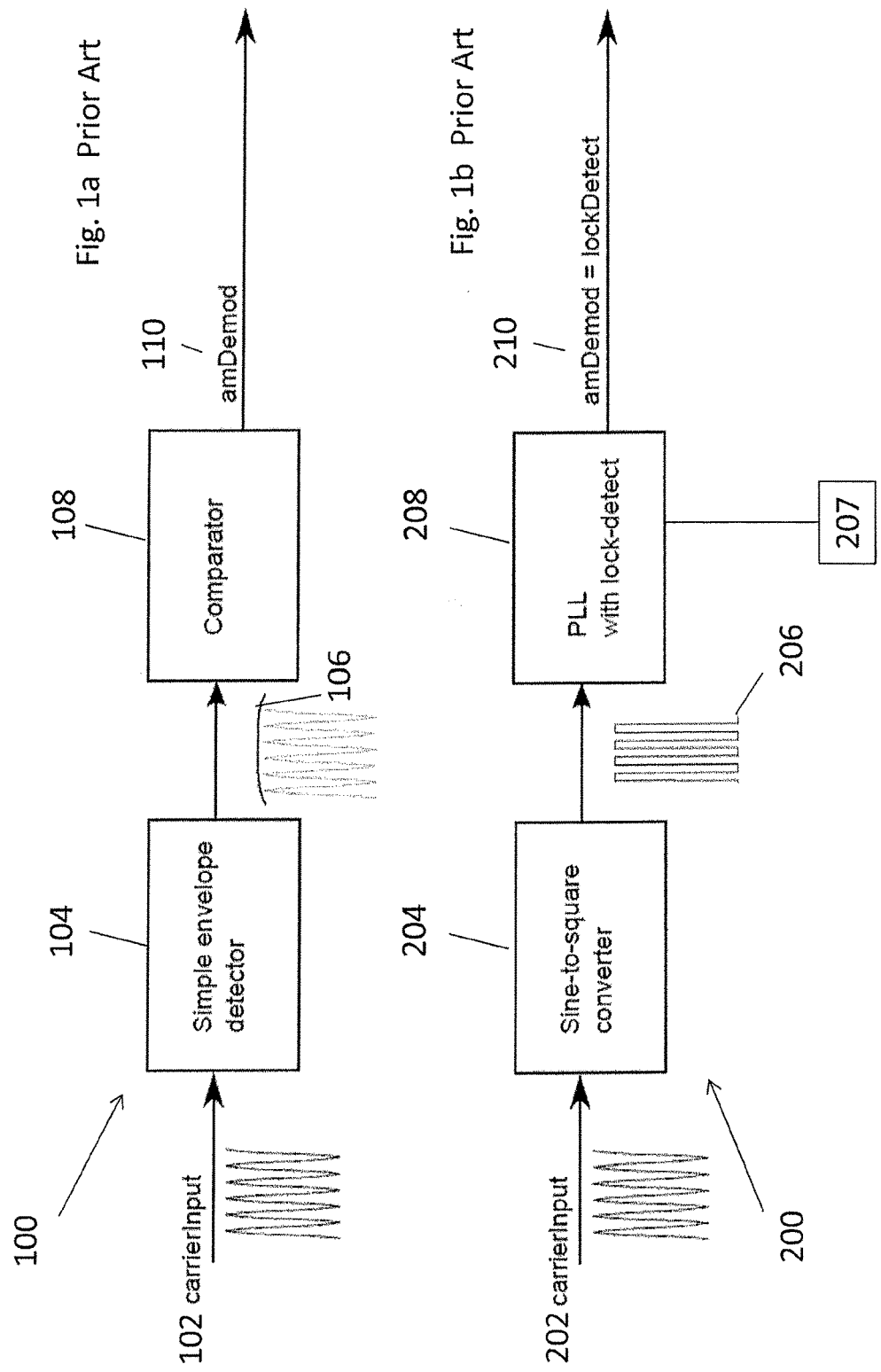
FIG. 1a is a block diagram of a conventional analogue envelope detector.
FIG. 1b is a block diagram of a conventional phase-locked loop demodulator.

FIG. 1a shows a block diagram of a conventional analogue envelope detector demodulator arrangement 100. An incoming modulated signal 102 is fed into an analogue envelope detector 104. This envelope detector 104 could take the form of a simple rectifier. The envelope detector 104 produces as an output an envelope signal 106. This envelope signal 106 has a shape that closely follows the envelope of the input modulated signal 102. The resulting envelope signal 106 is then fed into a comparator 108 that compares the envelope signal 106 to a threshold in order to produce a demodulated signal 110.

FIG. 1b shows a block diagram of a conventional phase-locked loop demodulation arrangement 200. An incoming modulated signal 202 is fed into a sine-to-square convertor 204 which produces as an output a square wave 206. This square wave 206 has a fixed phase relationship with the incoming modulated signal 202 as will be detailed further with reference to FIG. 2. A phase-locked loop with lock-detect 208 takes the square wave 206 as a first input and a matched frequency local oscillator 207 as a second input. During a modulation symbol, there is no longer a phase relationship between the square wave 206 and the oscillator 207 and so the phase-locked loop loses lock. The signal that signifies when the phase-locked loop does and does not have lock provides as an output a demodulated signal 210.

Figure 2:
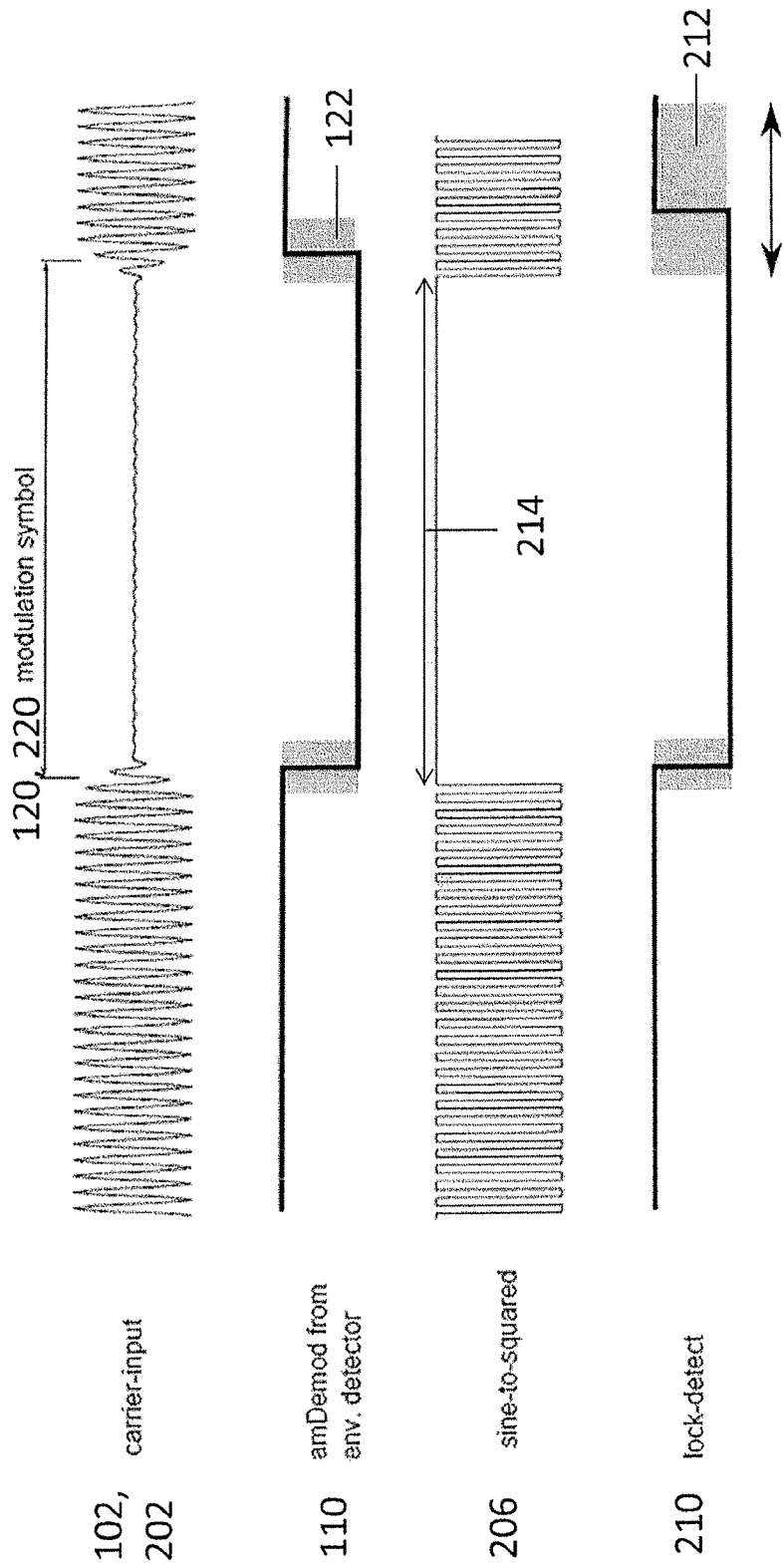
FIG. 2 is a timing diagram of a conventional simple analogue envelope detector and a conventional phase-locked loop demodulator.

FIG. 2 shows timing diagrams for the conventional analogue envelope detector demodulator arrangement 100 of FIG. 1a and the phase detector demodulator arrangement 200 of FIG. 1b, showing the nature of the signals associated therewith as a function of time.

The modulated signal 102,202 is composed of a carrier signal (in this example the carrier signal is a sinusoidal waveform) that has been modulated using amplitude modulation (AM) techniques, such that the envelope of the resulting modulated signal 102,202 conveys symbols, in this case of two distinct signal levels. The length of the symbol 120,220 is the duration for which the signal level is below a given threshold.

When using the analogue envelope detector demodulator arrangement 100, the modulated signal 102 is processed by the envelope detector 104 and a demodulated signal 110 is obtained. Here it can be seen that the envelope of the demodulated signal 110 follows the envelope of the modulated signal 102, and has undergone a threshold operation to define the symbol edges. However, as can be seen in the Figure, due to inevitable process variation in the components of the edge detector, there is a degree of uncertainty 122 in the end of the modulation symbol, which leads to the length of the symbol present in the demodulated signal 110 being different to the length of the symbol 120 as originally present in the modulated signal 102.

When using the phase-locked loop demodulation arrangement 200, the modulated signal 202 is processed by the sine-to-square converter 204 which produces a converted square wave signal 206. When no modulation symbol 220 is present, the converted square wave signal 206 has the same frequency as the modulated signal 202. However, during a modulation symbol 220, the converted square wave signal 206 remains constant for a square wave symbol duration 214. The converted square wave signal 206 latches high or low during a modulation symbol 220 but which one it will be is not predictable and may change each time.

In this conventional phase-locked loop demodulation arrangement 200 (FIG. 1b), the converted square wave signal 206 is then input to a phase-locked loop with lock detector 208. The phase-locked loop with lock detector 208 has a local free running oscillator 207 that runs at the carrier frequency and compares the local oscillator signal 207 to the converted square wave signal 206 and determines a phase relationship between the two signals and produces an output signal 210.

The output signal 210 is high when the phase-locked loop has established lock (i.e. there is a fixed phase relationship between the local oscillator signal and the converted square wave signal 206). In contrast, the output signal 210 is low when no lock can be established, which occurs when a modulation symbol 220 is present, causing the converted square wave signal 206 to remain constant for a square wave symbol duration 214, removing the phase relationship between the converted square wave signal 206 and the local oscillator signal. The output signal 210 follows the general shape of the modulating signal that formed the modulated signal 202, thus providing a demodulated signal. However, the demodulated output signal 210 has a degree of uncertainty 212 regarding the position of the end of the modulation symbol due to the variable time taken to re-establish lock.

FIG. 3 shows a block diagram of an exemplary embodiment of the present invention e.g. for use in a two-way radio communication system. An antenna 328 receives an incoming signal 326, and provides a received signal 330 to an amplifier 332. The received signal 330 is amplified by the amplifier 332 to provide sufficient amplitude for use by the demodulator 300. An amplified signal 334 is then processed by a down converter 336 to produce a modulated signal input 302 suitable for demodulation. In other embodiments e.g. in a near-field communication (NFC) implementation the down converter and/or amplifier may not be needed. The incoming modulated signal 302 is directed into a sine-to-square converter 304 which produces a converted square wave signal 306.

The converted square wave signal 306 is then input to a phase-locked loop with lock detector 308. The phase-locked loop with lock detector 308 has a local free running oscillator 309 that runs at the carrier frequency and compares this local oscillator signal to the converted square wave signal 306 and determines a phase relationship between the two signals and produces a lock detection signal 310.

The converted square wave signal 306 is also input to an edge detector 314. The edge detector 314 comprises two latches, the first of which provides a positive edge signal 318 that latches to a logic high value when the converted square wave signal 306 is above a predetermined threshold value, the second of which provides a negative edge signal 320 that latches to a logic high value when the converted square wave signal 306 is below another predetermined threshold value.

The lock detection signal 310 is input to a combiner 312 that monitors for the presence of a modulation symbol and provides a latch reset signal 316 to the edge detector 314. This combiner 312 also takes the positive 318 and negative 320 edge signals and combines these inputs with the lock detection signal 310 to produce a demodulated output signal 322, as will be explained further with reference to FIG. 4 below.

FIG. 4 is a timing diagram of the exemplary embodiment of the present invention shown in FIG. 3 and shows the nature of the signals associated with the various components of the invention as a function of time.

The modulated signal 302 is composed of a carrier signal (in this example the carrier signal is a sinusoidal waveform) that has been modulated using amplitude modulation (AM) techniques, such that the envelope of the resulting modulated signal 302 conveys symbols, in this case of two distinct signal levels. The length of the symbol 340 is the duration for which the signal level is below a given threshold.

When using the phase-locked loop demodulation arrangement 300, the modulated signal 302 is processed by the sine-to-square converter 304 which produces a converted square wave signal 306. When no modulation symbol 340 is present, the converted square wave signal 306 has the same frequency as the modulated signal 302. However, during a modulation symbol 340, the converted square wave signal 306 remains constant for a square wave symbol duration 314. Due to hysteresis present in the sine-to-square converter 304, the converted square wave signal 306 latches high or low during a modulation symbol 340 but it is not predictable which it will be and may change each time.

The lock detection signal 310 of the phase-locked loop with lock detector 308 is high when the phase-locked loop has established lock (i.e. there is a fixed phase relationship between the local oscillator signal and the converted square wave signal 306). In contrast, the lock detection signal 310 is low when no lock can be established, which occurs when a modulation symbol 340 is present, causing the converted square wave signal 306 to remain constant for a square wave symbol duration 314, removing the phase relationship between the converted square wave signal 306 and the local oscillator signal. The output signal 310 follows the general shape of the modulating signal that formed the modulated signal 302, thus providing a demodulated signal. However, the lock detection signal 310 has a degree of uncertainty 346 regarding the position of the end of the modulation symbol.

A combiner 312 monitors the lock detection signal 310. Once the lock detection signal 310 has been low for a predetermined length of time (indicating that a modulation symbol 340 is present), the combiner 312 provides a latch reset signal 316 to the edge detector 314 which resets both latches to a logic low value 352. As the latches trigger with respect to a threshold, as soon as the latch reset signal 316 is removed, one of the two latches will immediately trigger, but it is not known in advance which one will trigger due to the hysteresis in the sine-to-square converter 304 as explained above. The combiner 312 detects the triggering of the first latch and then monitors for the triggering of the second latch, as this will signify the end of the modulation symbol 340.

As at this time the converted square wave signal 306 is high, the positive edge signal 318 immediately triggers to a logic high value 354, signifying that the combiner 312 must monitor for the negative edge signal 320 to trigger to a logic high value at a later time 356.

The lock detection signal 310 is then combined with the more accurate detected negative edge signal 320 to produce the demodulated output signal 322 that has a narrower window of uncertainty 348 when compared to the uncertainty 346 associated with the lock detection signal 310 as used in the conventional phase-locked loop demodulation arrangement of FIG. 1b.

It is then possible to validate the detected edge by checking that the lock detection signal 310 returns to a logic high value after the negative edge signal triggers to a logic high value 356. This produces a demodulated signal with validation 324 that has a slight time delay when compared to the demodulated signal without validation 322.

Thus it will be seen that a method for demodulating a modulated signal wherein symbol edges can be determined with less analogue process variation than in conventional methods has been described.

Although a particular embodiment has been described in detail, many variations and modifications are possible within the scope of the invention.

The invention claimed is:

1. A method of demodulating an amplitude modulated radio signal comprising directing said modulated signal to both a phase detector and an edge detector, and using the respective output signals of the phase detector and edge detector to determine an end of a modulation symbol in said signal, further comprising detecting a first output of the edge detector latching to a first output value after resetting the edge detector and monitoring for a second output of the edge detector latching to a second output value.

2. The method of claim 1 wherein the phase detector comprises a phase locked loop and a lock detector.

3. The method of claim 1 comprising feeding the modulated signal to a sine-to-square converter.

4. The method of claim 3 wherein the output of the sine-to-square converter comprises a square wave when no modulation symbol is present and a constant value when a modulation symbol is present.

5. The method of claim 1 wherein the first output of the edge detector latches to the first output value when the input to the edge detector is above a first threshold value, and the second output of the edge detector latches to the second output value when the input to the edge detector is below a second threshold value.

6. The method of in claim 1 comprising resetting the edge detector after the phase detector has detected the modulation symbol.

7. The method of claim 1 comprising using the second output of the edge detector latching to the second output value to indicate the end of the modulation symbol.

8. The method of claim 1 comprising validating an edge detected by the edge detector by checking that the edge is followed by the phase detector output going high.

9. A receiver arranged to demodulate an amplitude modulated radio signal comprising a phase detector and an edge detector that are both arranged to receive the modulated signal, the receiver being arranged to use the respective output signals of the phase detector and edge detector to determine an end of a modulation symbol in said modulated signal, the receiver further comprising a combiner arranged to detect a first output of the edge detector latching to a first output value after resetting the edge detector and to monitor for a second output of the edge detector latching to a second output value.

10. The receiver of claim 9 wherein the phase detector comprises a phase locked loop and a lock detector.

11. The receiver of claim 9 wherein the modulated signal is fed to a sine-to-square converter.

12. The receiver of claim 11 wherein the output of the sine-to-square converter comprises a square wave when no modulation symbol is present and a constant value when a modulation symbol is present.

13. The receiver of claim 9 wherein the first output of the edge detector latches to the first output value when the input to the edge detector is above a first threshold value, and the second output of the edge detector latches to the second output value when the input to the edge detector is below a second threshold value.

14. The receiver of claim 9 wherein the combiner is arranged to reset the edge detector after the phase detector has detected the modulation symbol.

15. The receiver of claim 9 wherein the second output of the edge detector latching to the second output value is used to indicate the end of the modulation symbol.

16. The receiver of claim 9 wherein an edge detected by the edge detector is validated by checking that the edge is followed by the phase detector output going high.

17. The receiver of claim 9 wherein the demodulator is implemented in a battery powered integrated circuit.

* * * * *